United States Patent [19]
Viereck

[11] Patent Number: 5,168,282
[45] Date of Patent: Dec. 1, 1992

[54] ANTENNA RESONANT CIRCUIT

[75] Inventor: Bruno G. Viereck, Marzling, Fed. Rep. of Germany

[73] Assignee: Texas Instruments Deutschland GmbH, Freising, Fed. Rep. of Germany

[21] Appl. No.: 746,297

[22] Filed: Aug. 13, 1991

Related U.S. Application Data

[63] Continuation of Ser. No. 538,873, Jun. 15, 1990, abandoned.

[30] Foreign Application Priority Data

Jun. 22, 1989 [DE] Fed. Rep. of Germany ....... 3920536

[51] Int. Cl.⁵ .................. H01Q 23/00; H01Q 9/00; H04B 1/440
[52] U.S. Cl. .................. 343/745; 343/748; 343/850; 455/83
[58] Field of Search .............. 455/77, 82, 83; 333/129, 132, 134; 343/702, 748, 850, 852, 876, 745, 742, 858, 867, 856

[56] References Cited

U.S. PATENT DOCUMENTS

| | | | |
|---|---|---|---|
| 3,102,991 | 9/1963 | Jess | 455/82 |
| 3,117,241 | 1/1964 | Paynter et al. | 455/82 |
| 3,452,299 | 6/1969 | Angel | 455/83 |
| 4,542,532 | 9/1985 | McQuilkin | 455/82 |
| 4,963,880 | 10/1990 | Torre et al. | 343/876 |
| 4,973,940 | 11/1990 | Sakai et al. | 333/132 |

FOREIGN PATENT DOCUMENTS 2598051 10/1987 France ......................... 455/83

OTHER PUBLICATIONS

M. J. K.öppen, P-1-N Diode Aerial Switches for the 160 MHz Communication Band, Electronic Applications (Neth.) vol. 30, No. 3, 1970, pp. 98–103.

Primary Examiner—Rolf Hille
Assistant Examiner—Peter Toby Brown
Attorney, Agent, or Firm—Rebecca A. Mapstone; James C. Kesterson; Richard L. Donaldson

[57] ABSTRACT

An antenna resonant circuit (10) is described having a coil (18, 26) and a capacitor (30) as frequency-determining elements for use in a transmitting/receiving device which in a transmitting operating phase transmits HF signals of high power and in a receiving operating phase receives HF signals of low power. In the antenna resonant circuit (10) parallel to the capacitor (30) there is a series circuit of a further capacitor (32) and a threshold value switch (34, 36). Said threshold value switch (34, 36) is of high resistance when the voltage applied thereto is smaller than its threshold value and of low resistance when the voltage applied thereto is greater than its threshold value. The threshold value of the threshold value switch (34, 36) is so set that it is greater than the voltage applied thereto in the receiving operating phase but smaller than the voltage applied thereto in the transmitting operating phase.

3 Claims, 1 Drawing Sheet

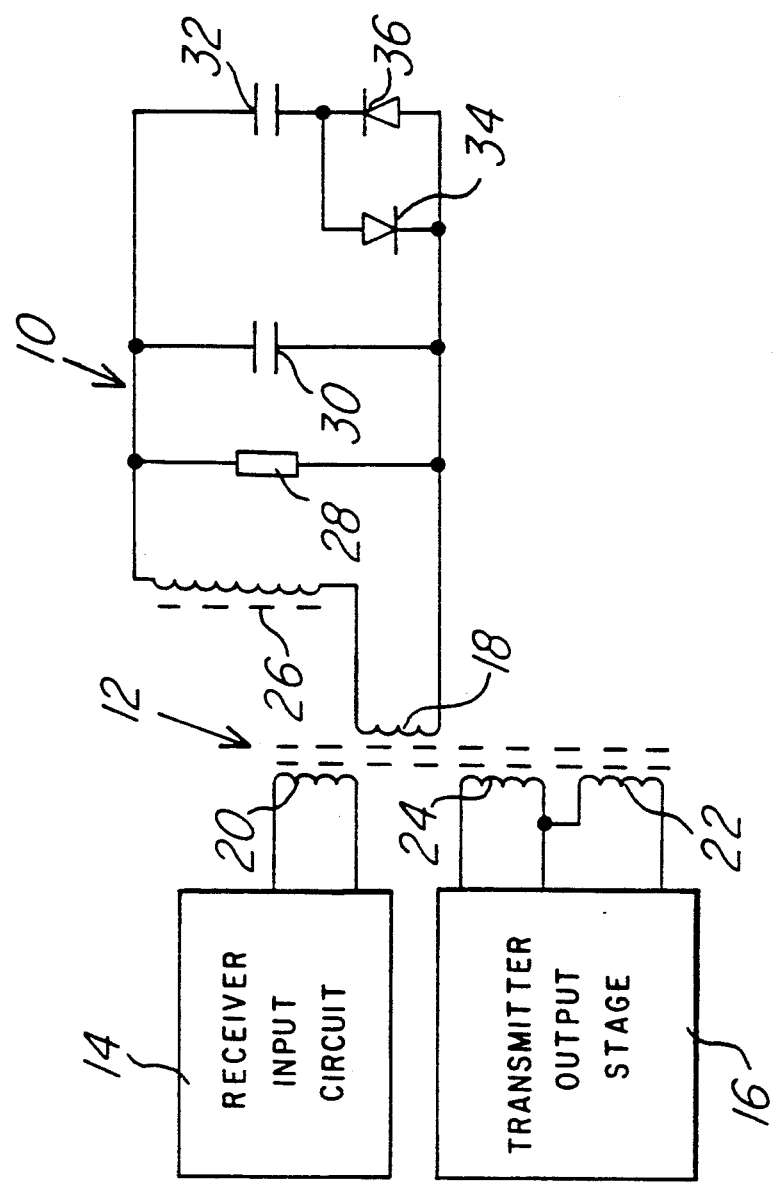

ANTENNA RESONANT CIRCUIT

This application is a Continuation of application Ser. No. 07/538,873, filed Jun. 15, 1990, and now abandoned.

The invention relates to an antenna resonant circuit comprising a coil and a capacitor as frequency-determining elements for use in a transmitting/receiving device. In a transmitting operating phase, the device transmits HF signals with high power, and in a receiving operating phase receives HF signals with low power.

Fields of use exist for transmitting/receiving devices in which in the transmitting operating phase, HF signals are transmitted with a fixed frequency, whilst in the receiving operating phase HF signals with different frequencies, for example frequency-shifted signals, are received. This means that in the transmitting operating phase, as narrow as possible a band should be used to achieve a good irradiation of the transmitted signal, whilst in the receiving operating phase, a certain band wideness of the band filter formed by the antenna resonant circuit and by the input circuit of the receiving section in the transmitting/receiving device must be achieved. One measure for doing this resides in forming the antenna resonant circuit and the input circuit of the receiving section as a loosely coupled band filter. It has, however, been found in practice that this step does not suffice for maintaining in both operating phases a favourable transmission behaviour between the transmitting/receiving device and the antenna resonant circuit.

The invention is based on the problem of further developing an antenna resonant circuit of the type set forth at the beginning, in such a manner that its resonant frequency can be influenced so that both, in the transmitting operating phase, and in the receiving operating phase, a favourable transmission behaviour of the band filter coupling the antenna resonant circuit to the transmitting/receiving device is obtained.

This problem is solved according to the invention in that in parallel with the capacitor and the coil there is a series circuit of a frequency-determining component and a threshold value switch. The threshold value switch is of high resistance when the voltage applied thereto is smaller than its threshold value and of low resistance when the voltage applied thereto is greater than its threshold value. The switching threshold of the threshold value switch is so set that it is greater than the voltage applied thereto in the receiving operating phase, but smaller than the voltage applied thereto in the transmitting operating phase. In the antenna resonant circuit, according to the invention the resonant frequency can be switched by means of the threshold value switch. The switching is based on the specific adjustment of the switching threshold, resulting automatically when there is a mode switching between the transmitting operating phase and the receiving operating phase, and vice versa. The frequency-governing element connected in series with the threshold value switch may be chosen such that a desired change of the resonant frequency results.

Further advantageous developments of the invention are set forth in the subsidiary claims.

The invention will now be explained by way of example with reference to the drawing the single Figure of which shows a circuit diagram of the antenna resonant circuit with its coupling to a transmitting/receiving device, only the major components necessary for the explanation of the invention being illustrated.

The antenna resonant circuit illustrated in the drawing is coupled via a transformer 12 to a transmitter/receiver device of which only the input circuit 14 of the receiver section and the output stage 16 of the transmitter section are illustrated.

The antenna resonant circuit 10 is coupled via a winding 18 to the winding 20 of the input circuit 14 and the windings 22 and 24 of the output stage 16. HF signals can be transmitted and received from a coil 26 in the antenna resonant circuit. Furthermore, the antenna resonant circuit 10 includes parallel to the series circuit of the coils 26 and 18, a resistor 28, a capacitor 30 and a series circuit of a further capacitor 32 and two semiconductor diodes 34 and 36 connected antiparallel.

The semiconductor diodes 34, 36 form a threshold value switch which is in the high-resistance state as long as the voltage applied thereto lies beneath the threshold voltage of the semiconductor diodes. As soon as the threshold voltage of the semiconductor diodes is exceeded, the threshold value switch assumes the low-resistance state so the the parallel combination of the capacitors 30 and 32 is active on the antenna circuit.

For transmitting-receiving devices it is typical that the radiated transmission power is substantially higher than the power of the received signals. This fact is utilized for actuating the threshold value switch comprising the semiconductor diodes 34, 36. In the transmitting-operating phase in the antenna resonant circuit 10, due to the relatively high transmission power, high voltages occur which lead with certainty to a voltage occurring at the semiconductor diodes 34 and 36 which is greater than the threshold voltage thereof. This means that in the transmitting operating phase, the capacitor 32 lies in parallel with the capacitor 30 and consequently a resonant frequency results for which the sum of the capacitances of the capacitor 30 and the capacitor 32 is a governing factor. In contrast, in the receiving operating phase, at the semiconductor diodes 34, 36 only very low voltages occur which lie beneath the threshold voltage of said diodes. This means that the capacitor 32 is separate from the antenna resonant circuit so that only the capacitor 30 is a governing factor in the resonant frequency. This therefore gives, in the receiving operating phase, a higher resonant frequency, than in the transmitting operating phase. This higher resonant frequency however, results in a wider bandpass characteristic of the band filter formed by the antenna resonant circuit and the input circuit 14 of the receiver section. This broad-bandedness is particularly desirable when, as mentioned at the beginning, the received HF signals are frequency-modulated, i.e. have a greater bandwidth than the signals transmitted by the antenna.

I claim:

1. A parallel antenna resonant circuit, operable to transmit and receive, and having a selected transmit resonant frequency and a selected receive resonant frequency, comprising:
    an antenna coil for transmitting and receiving HF signals, said antenna coil also operable as a first resonant frequency-determining element;
    a second resonant frequency-determining element connected in parallel with said first resonant frequency-determining element;
    a series combination of a third resonant frequency-determining element and a threshold value switch, said series combination in parallel with said first and second resonant frequency-determining elements, said threshold value switch operable to be electrically conductive during a transmit mode thereby determining the selected transmit resonant frequency to be a function of the parallel combination of said first, second and third resonant frequency-determining elements and said threshold value switch operable to present a high resistance during a receive mode thereby effectively eliminating the effect of said third resonant frequency-determining element from said resonant circuit, and determining the selected receive resonant frequency to be a function of the parallel combination of said first and said second resonant frequency-determining elements; and wherein said threshold value switch consists of a single set of two diodes connected antiparallel.

2. A parallel antenna resonant circuit, operable to transmit and receive, and having a selected transmit resonant frequency and a selected receive resonant frequency, comprising:

an antenna coil for transmitting and receiving HF signals, said antenna coil also operable as a first resonant frequency-determining element;

a second resonant frequency-determining element connected in parallel with said first resonant frequency-determining element;

a series combination of a third resonant frequency-determining element and a threshold value switch, said series combination in parallel with said first and second resonant frequency-determining elements, said threshold value switch operable to be electrically conductive during a transmit mode thereby determining the selected transmit resonant frequency to be a function of the parallel combination of said first, second and third resonant frequency-determining elements and said threshold value switch operable to present a high resistance during a receive mode thereby effectively eliminating the effect of said third resonant frequency-determining element from said resonant circuit, and determining the selected receive resonant frequency to be a function of the parallel combination of said first and said second resonant frequency-determining elements;

wherein said threshold value switch is operable in response to a voltage applied across said threshold value switch when said antenna resonant circuit is transmitting and receiving; and wherein further said threshold value switch has a switching threshold value that is greater than said voltage applied thereto when said antenna resonant circuit is receiving such that said switch is non-conducting and presents a high resistance to said antenna resonant circuit to effectively eliminate said third frequency-determining element from said resonant circuit.

3. A parallel antenna resonant circuit, operable to transmit and receive, and having a selected transmit resonant frequency and a selected receive resonant frequency, comprising:

an antenna coil for transmitting and receiving HF signals, said antenna coil also operable as a first resonant frequency-determining element;

a second frequency-determining element connected in parallel with said first resonant frequency-determining element;

a series combination of a third resonant frequency-determining element and a threshold value switch, said series combination in parallel with said first and second resonant frequency-determining elements, said threshold value switch operable to be electrically conductive during a transmit mode thereby determining the selected transmit resonant frequency to be a function of the parallel combination of said first, second and third resonant frequency-determining elements and said threshold value switch operable to present a high resistance during a receive mode thereby effectively eliminating the effect of said third resonant frequency-determining element from said resonant circuit, and determining the selected receive resonant frequency to be a function of the parallel combination of said first and said second resonant frequency-determining elements;

wherein said threshold value switch is operable in response to a voltage across said threshold value switch when said antenna resonant circuit is transmitting and receiving; and wherein further said threshold value switch has a switching threshold value that is less than said voltage applied thereto when said antenna resonant circuit is transmitting such that said switch is conducting and said resonant circuit frequency is determined by said parallel combination of said first, second and third resonant frequency-determining elements.

* * * * *